United States Patent
Iguchi et al.

(10) Patent No.: US 7,699,320 B2
(45) Date of Patent: Apr. 20, 2010

(54) SEAL DEVICE

(75) Inventors: Tetsuya Iguchi, Tokyo (JP); Jun Hiromatsu, Tokyo (JP)

(73) Assignee: Eagle Engineering Aerospace Co., Ltd., Tokyo (JP)

( * ) Notice: Subject to any disclaimer, the term of this patent is extended or adjusted under 35 U.S.C. 154(b) by 0 days.

(21) Appl. No.: 11/896,925

(22) Filed: Sep. 6, 2007

(65) Prior Publication Data

US 2008/0073861 A1    Mar. 27, 2008

Related U.S. Application Data

(63) Continuation of application No. 11/508,335, filed on Aug. 23, 2006, now abandoned, and a continuation of application No. 11/055,970, filed on Feb. 14, 2005, now abandoned.

(30) Foreign Application Priority Data

Feb. 20, 2004    (JP) .............................. 2004-044107

(51) Int. Cl.
*F16J 15/02*    (2006.01)
*F16L 17/00*    (2006.01)
*F16L 21/025*   (2006.01)

(52) U.S. Cl. .................. 277/644; 277/647; 277/604; 277/626

(58) Field of Classification Search ................ 277/644, 277/604, 614, 616, 626, 647
See application file for complete search history.

(56) References Cited

U.S. PATENT DOCUMENTS

| 2,569,778 | A |  | 10/1951 | Phillips |
|---|---|---|---|---|
| 2,701,155 | A | * | 2/1955 | Estel, Jr. ................. 277/555 |
| 4,121,843 | A |  | 10/1978 | Halling |
| 4,690,412 | A |  | 9/1987 | Tuckley et al. |
| 5,398,945 | A |  | 3/1995 | Hinshaw et al. |
| 5,630,593 | A |  | 5/1997 | Swensen et al. |
| 6,237,921 | B1 |  | 5/2001 | Liotta et al. |
| 6,352,267 | B1 |  | 3/2002 | Rode |
| 6,626,440 | B2 |  | 9/2003 | Halling |
| 2002/0125650 | A1 |  | 9/2002 | Halling |

FOREIGN PATENT DOCUMENTS

JP    2002-005290    1/2002

* cited by examiner

*Primary Examiner*—Peter M Cuomo
*Assistant Examiner*—Jonathan J Liu
(74) *Attorney, Agent, or Firm*—Arent Fox LLP (57) ABSTRACT

A seal device includes a first seal portion, a second seal portion, and a joint base, wherein the first seal portion has a first elastic portion with a flat side surface at one side of a first bight portion and a second elastic portion at the other side of the first bight portion. The second seal portion has a first symmetrical elastic portion with a flat side surface at one side of a second bight portion and a second symmetrical elastic portion at the other side of the second bight portion. A first seal face is disposed on a first outmost circumferential surface of the first elastic portion, and a second seal face is disposed on a second outmost circumferential surface of the first symmetrical elastic portion.

4 Claims, 8 Drawing Sheets

SEAL DEVICE

CROSS-REFERENCE TO RELATED APPLICATIONS

This is a continuation application, which claims the benefit of U.S. patent application Ser. No. 11/508,335 filed Aug. 23, 2006 and now abandoned U.S. patent application Ser. No. 11/055,970, filed Feb. 14, 2005, now abandoned. The disclosures of the prior applications are hereby incorporated herein in their entirety by reference.

BACKGROUND OF THE INVENTION

1. Field of the Invention

The present invention relates to a seal device which is fabricated to a special form from a sheet material. More particularly, this invention relates to a seal device which is installed in assembly components wherein a clearance between mount surfaces thereof varies due to fluid pressure, vibratory external force, thermal expansion or contraction or the like.

2. Description of the Related Art

In an apparatus in which a seal device is installed between mount surfaces of adjacent assembly components for a sealing purpose thereat, a gap between the mount surfaces is forced to vary because of external forces, which causes a problem of decreasing in seal ability of the seal device. As an example, a seal ring is widely known for a gas turbine engine. The seal ring is used in a gas or steam turbine engine in which the ring is installed between mount surfaces which are subjected to thermal expansion stress of high temperature combustion gas or deformation due to compressed air pressure or vibratory force during rotary movement (see U.S. Pat. No. 6,237,921.B1 for instance). Mount surfaces in a gas turbine, nuclear apparatus or the like are exposed to high temperature, high pressure environment, thus a dimensional change between the mount surfaces being likely to occur. There is another type of seal ring used for such applications (see U.S. Pat. No. 4,121,843 for instance).

Figure 7:
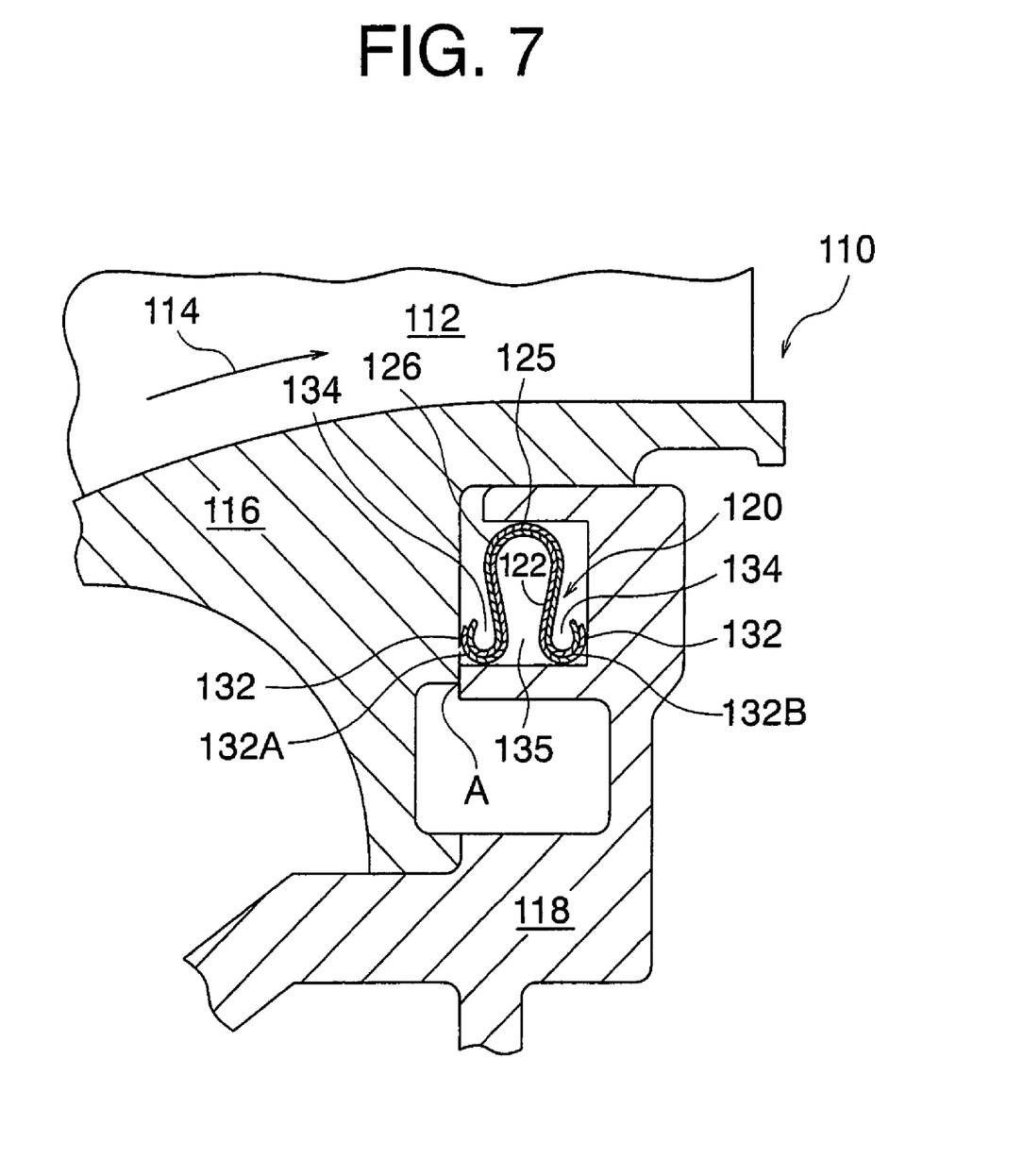
FIG. 7 is a cross-sectional view showing a typical installation of a seal device similar to a relative art related to the present invention.

FIG. 7 depicts a seal ring which is similar to the one disclosed in FIG. 1 of U.S. Pat. No. 6,237,921.B1. As shown in FIG. 7, the seal ring 120 has U-shaped cross-section thereof. Both end portions of the U-shaped seal ring 120 define reverse bend portions 132, 132. The seal ring 120 is a two-ply construction consisting of an inner ring 122 and an outer ring 126. Also an inner circumferential portion of the inner ring 122 defines a groove 135.

The seal ring 120 is used to effect a seal against a high pressure turbine nozzle 110 of a gas turbine. The high pressure turbine nozzle 110 retains a plurality of nozzle vanes 112. The nozzle bane 112 is mounted to a radially inner band 116 in an integral manner which is supported by a support flange 118. The seal ring 120 is arranged between the inner band 116 and the support flange 118 in order to bring the inner band 116 of the high pressure turbine nozzle 110 into sealing contact with the support flange 118.

In this high pressure turbine nozzle 110, high temperature combustion gases 114 received from an upstream combustion chamber (not shown) is turned and accelerated through the nozzle vanes 112. The inner band 116 and the support flange 118 start to receive thermal deformation as heating proceeds. The seal ring 120 which is disposed between the inner band 116 and the support flange 118 impaired by the deformation due to thermal expansion is forced to undergo elastic deformation to an axial direction. Under this circumstance, a contact point 125 of the seal ring 120 which is located at the center of a U-shaped bending portion is supported by the support flange 118. This causes the seal ring 120 to have the reverse bend portions 132, 132 brought into contact with the inner band 116 and the support flange 118 and axially extending slots 134, 135, 134 are formed at three locations from the illustrated left to right along the reverse bend portions 132, 132. Therefore, although the seal ring 120 exhibits a wide range of elastic deformation in the axial direction, it becomes increasingly more difficult for seal faces 132A, 132B of the seal ring 120 which are resiliently supported by the U-shaped resilient member at the contact point 125 to achieve a uniform contact force because of such large elastic deformation. That is, the seal faces 132A, 132B may fail to keep up with the movement of the inner band 116 and the support flange 118, which will cause decreasing in seal ability thereat.

Out of the three open-ended slots 134, 135, 134 of the seal ring 120 with U-shaped cross-section, the largest slot 135 formed in the inner circumferential side has its open-ended portion in an opposite direction to the other two small slots 134 which are relatively located to the both sides of the largest slot 135. Therefore, such a configuration increases the production cost because of the difficult bending process involved.

Figure 8:
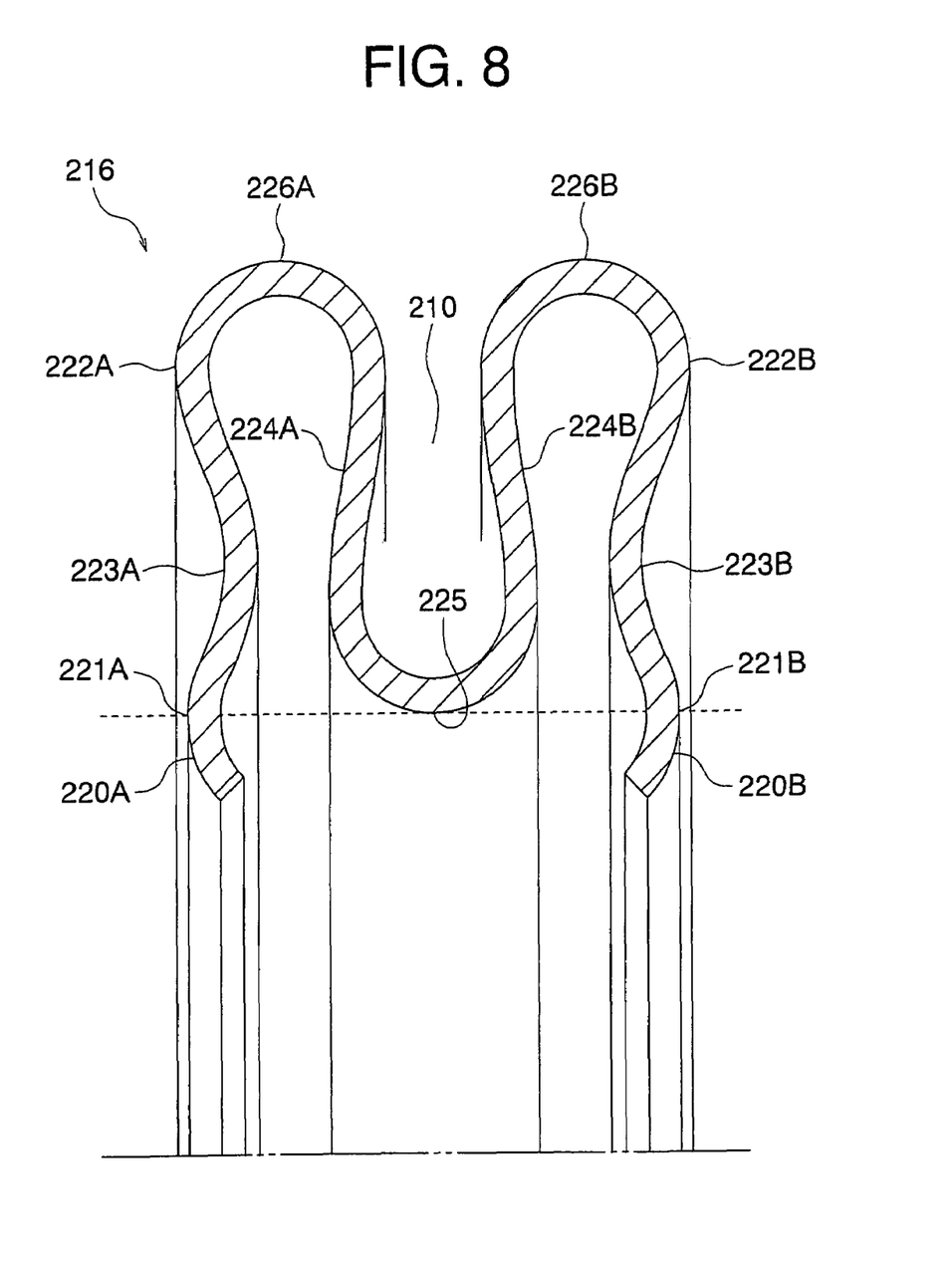
FIG. 8 is a cross-sectional view of a seal device similar to a relative art related to the present invention.

FIG. 8 shows a seal ring 216 with an "E"-shape cross-section. The seal ring 216 consists of a couple of U-shaped cross sectioned members, first annular seal portion 220A and second annular seal portion 220B, which are joined at one end by means of a middle bridge portion 225. A middle groove 210 is formed between the first annular seal portion 220A and the second annular seal portion 220B in the illustrated above of the middle bridge portion 225. A first elastic portion 224A and a second elastic portion 224B which are joined by the middle bridge portion 225 are continuously extended to form a third elastic portion 226A and a fourth elastic portion 226B of a semi-circular section, respectively. The semi-circular third elastic portion 226A and fourth elastic portion 226B, respectively, retain arcuate first seal face 222A and second seal face 222B at outer circumferential sides thereof which are brought into contact with assembly components. The seal ring 216 enjoys resiliently urging force according to a distance from the middle bridge portion 225 to the respective first seal face 222A and the second seal face 222B via first elastic portion 224A and second elastic portion 224B.

In the seal ring 216, because of the semi-circular form of the third elastic portion 226A and the fourth elastic portion 226B which are located at the opposite ends of the first elastic portion 224A and the second elastic portion 224B relative to the middle bridge portion 225, respectively, the first seal face 222A and the second seal face 222B may fail to maintain seal-tight contact against assembly components. That is, the elastic deformation forces of the first elastic portion 224A and the second elastic portion 224B rooted at the middle bridge portion 225 and evaluated at the first seal face 222A and the second seal face 222B are not significant enough to provide urging forces in such a way that the first seal face 222A and the second seal face 222B are always kept in uniform contact against the assembly components. This will lead to uneven and insufficient contact force of the first seal face 222A and the second seal face 222B, thus being likely to decrease in seal ability of the first seal face 222A and the second seal face 222B. The seal ring 216 also retains a third seal face 221A and a fourth seal face 221B via a fifth elastic portion 223A and a sixth elastic portion 223B, respectively, on the outer circumferential surface of the radially inward portion. The third seal face 221A and the fourth seal face 221B are said to be capable of maintaining seal-tight contact even in case of tilted mount surfaces of assembly components. As in the case of the third seal face 221A and the fourth seal face 221B, however, use of the middle bridge portion 225 as a fulcrum is likely to reduce the range of sufficient contact which the seal faces can achieve. Since the performance of the seal ring 216 needs to be evaluated as a total performance of the middle groove 210 and pressure receiving slots 134, 134 which are disposed sideways of the middle groove 210, it is not straightforward to manufacture precise dimension by a press forming process.

The present invention is introduced to resolve the above mentioned problems and the development of necessary technologies associated with the problems have been under way. A primary technical goal which this invention tries to achieve is to provide a seal device which is capable of exhibiting a substantial sealing ability over a wide range of dimensional change of a gap between seal mount surfaces which is caused by external forces due to a fluid pressure, heat-induced stress or the like. Another goal is to enhance seal structure thereof and reduce manufacture cost thereof. Yet another goal is to make the seal device compact such that it can be installed between narrow-gap mount surfaces and to reduce assembly cost. Yet another goal is to improve seal durability thereof.

BRIEF SUMMARY OF THE INVENTION

The present invention is made to alleviate the above technical problems and a solution to such problems is embodied as follows.

A seal device related to the present invention comprises a first seal portion with U-shaped cross section having a first elastic portion at one side of a first bight portion and a second elastic portion at the other side of the first bight portion, a second seal portion having a first symmetrical elastic portion at one side of a second bight portion and a second symmetrical elastic portion at the other side of the second bight portion, a joint base being deflected and joining the second elastic portion of the first seal portion and the second symmetrical elastic portion of the second seal portion such that the second elastic portion and the second symmetrical elastic portion are aligned in parallel with one another, a first seal face being disposed on a first outmost circumferential surface of the first elastic portion, and a second seal face being disposed on a second outmost circumferential surface of the first symmetrical elastic portion, wherein a side surface of the second elastic portion and a side surface of the second symmetrical elastic portion are in a contact relation or in a proximity contact relation with one another in an opposing manner at the joint base.

According to the seal device related to the present invention, cross section thereof is E-shaped and first and second seal faces, respectively, are disposed on outer circumferential surfaces of a first elastic portion and a first symmetrical elastic portion. And a second elastic portion and a second symmetrical elastic portion are aligned in parallel to one another. Therefore, when the first seal face and the second seal face which are in contact with mount surfaces are subjected to compression because of external forces or thermal stresses, the second elastic portion and the second symmetrical elastic portion undergo elastic deformation about the abutting contact surfaces of a contact interface portion as a fulcrum by changing an opening angle θ1 defined between the two adjoining contact surfaces. Under this circumstance, the elastic deformation of the second elastic portion and the second symmetrical elastic portion takes place in such a manner that the two surfaces depart from or come into contact with one another. Owing to the self-adjusting fulcrum about which contact surfaces of the contact interface portion change state thereof, the first and second seal faces are capable of exhibiting outstanding seal ability by keeping up with a displacement of the mount surfaces. Therefore, since the first seal face and the second seal face can effect a seal in accordance with such a deformation, the seal device is capable of maintaining outstanding seal ability thereof by accommodating even a large displacement of the mount surfaces.

Further, since the first seal face and the second seal face, respectively, are disposed on a first outmost circumferential surface and a second outmost circumferential surface which are formed by inflecting to a U-shape with respect to a joint base as a fulcrum, the total length for the joint base to the respective seal surfaces tends to become substantially long. This enables to accommodate to a wide range of deformation in the direction of contact in spite of rather short length of the second elastic portion and the second symmetrical elastic portion in radial direction thereof. Therefore, the first seal face and the second seal face achieve outstanding seal ability against deformation due to a variety of causes such as heat, pressure, vibration or the like. Further, the seal device can be made compact since the seal device determines respective deformation of the seal faces in accordance with the length of the first elastic portion and the first symmetrical elastic portion measured from the joint base as a fulcrum. Also the seal device does not require dimensional accuracy, thus yielding a low manufacture cost, because the abutting contact surfaces of the second elastic portion and the second symmetrical elastic portion can be either in a contact relation or in a proximity contact relation with one another. The proximity contact state of the adjoining contact surfaces between the second elastic portion and the second symmetrical elastic portion means that adjoining contact surfaces thereof become partially in a contact relation with one another when respective seal surfaces are urged by the side walls and the second elastic portion and the second symmetrical elastic portion undergo elastic deformation with an opening angle θ1 therebetween.

BRIEF DESCRIPTION OF THE DRAWINGS

Described below is details of the figures of preferred embodiments of a seal device constructed in accordance with the principles of the present invention. All the figures explained below are constructed according to actual design drawings with accurate dimensional relations.

Figure 1:
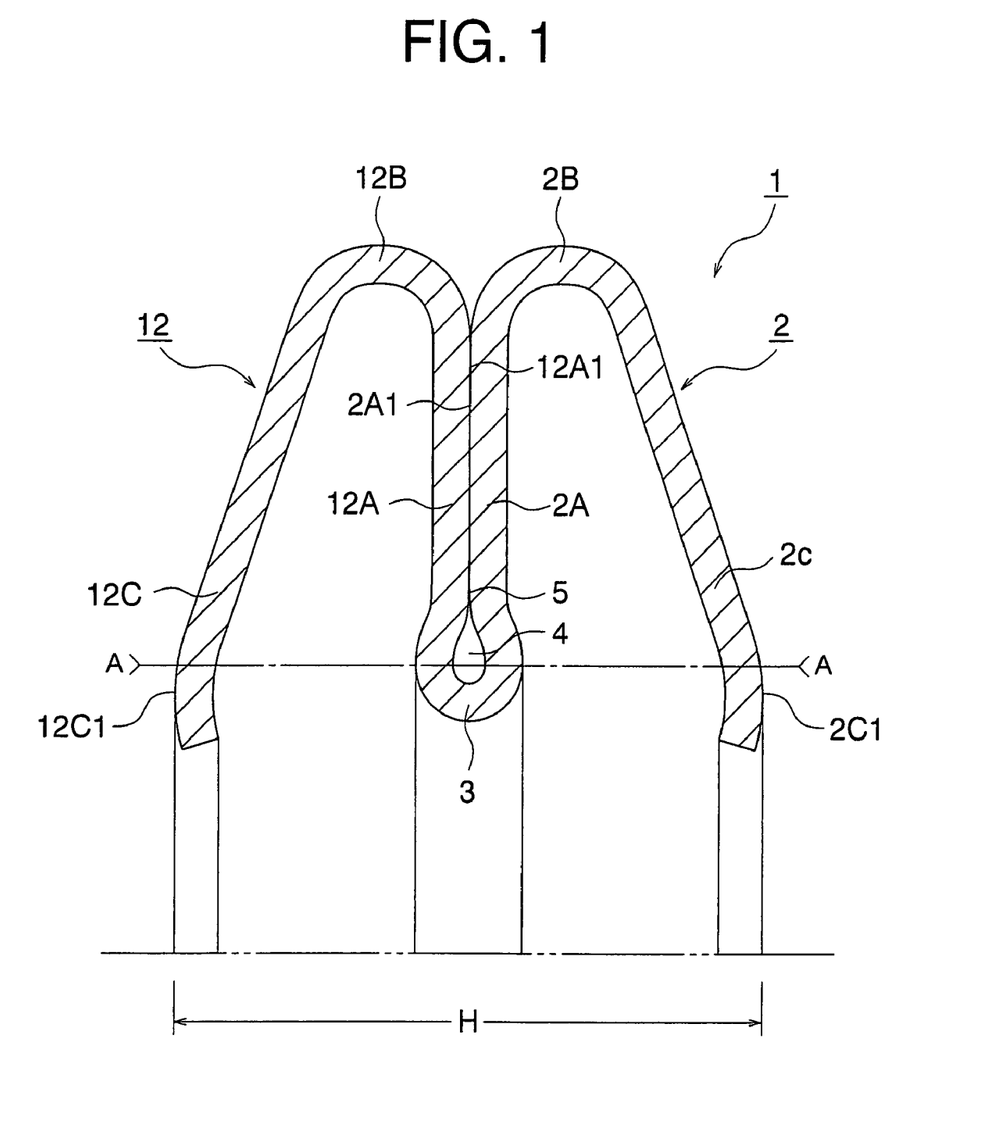
FIG. 1 is a cross-sectional view of a seal device according to a first embodiment of the present invention.

FIG. 1 is a radially half cross-sectional view of a seal device 1 as a preferred first embodiment relative to the present invention. In FIG. 1, the seal device 1 retains a couple of pressure receiving slots for receiving a pressure fluid in an inner circumferential side of an annularly-shaped body shaped from a resilient sheet material. This seal device 1 has an annularly-shaped body which is manufactured from a resilient sheet material by press forming and a radially half side of the cross-section has an E-shape. That is, in the seal device 1, a U-shaped cross-sectioned first seal portion 2 and a U-shaped cross-sectioned second seal portion 12 are connected in a symmetrical manner so as to form an E-shape as a whole. The first seal portion 2 consists of a first bight portion 2B, a first elastic portion 2C and a second elastic portion 2A in which the first elastic portion 2C and the second elastic portion 2A extend in opposite directions with respect to the first bight portion 2B.

Similarly, the second seal portion 12 consists of a second bight portion 12B, a first symmetrical elastic portion 12C and a second symmetrical elastic portion 12A in which the first symmetrical elastic portion 12C and the second symmetrical elastic portion 12A extend in opposite directions with respect to the second bight portion 12B. And a side surface 2A1 of the second elastic portion 2A of the first seal portion 2 and a side surface 12A1 of the second symmetrical elastic portion 12A of the second seal portion 12 are brought into contact with each other in order to define a contact interface portion 5. A state of the contact interface portion 5 which is determined by the side surface 2A1 of the second elastic portion 2A and the side surface 12A1 of the second symmetrical elastic portion 12A should preferably be either a full-contact state or a proximity contact state (the proximity contact state means a state in which the side surface 2A1 of the second elastic portion 2A and the side surface 12A1 of the second symmetrical elastic portion 12A comes into a full contact state with each other after being bent due to pressure from the first seal face 2C1 and the second seal face 12C1, respectively).

The gap formed under a proximity contact between the side surface 2A1 of the second elastic portion 2A and the side surface 12A1 of the second symmetrical elastic portion 12A should preferably be arranged in such a manner that urging forces exerted to the first seal face 2C1 and the second seal face 12C1 bring the second elastic portion 2A and the second symmetrical elastic portion 12A into contact with one another after being deflected in mutually opposing directions thereof and also that the contact surface is strong enough to sustain the first seal face 2C1 and the second seal face 12C1 An adjoining region of the second elastic portion 2A and the second symmetrical elastic portion 12A is defined as a joint base 3 which is inflected to a circular form. The joint base 3 may as well retain an annular space portion 4 therewithin which has an elliptic cross section. Note, however, that such an annular space portion 4 can be omitted if not necessary, because it would be sufficient if the side surface 2A1 of the second elastic portion 2A and the side surface 12A1 of the second symmetrical elastic portion 12A undergo elastic deformation with a variable angle θ1 therebetween which varies under contact state thereat. For example, the annular space portion 4 can be substituted by a proximity contact of planar surfaces. Examples of the sheet thickness of the seal device 1 tested are in a range of from 0.1 mm to 1 mm. More preferably, the thickness should be in a range of from 0.15 mm to 0.7 mm. The seal device 1 shown in FIG. 1 is manufactured by press forming from a sheet material with thickness of 0.3 mm.

Axially outmost circumferential surface which is formed by bending a leg portion of the first elastic portion 2C defines an arcuate first seal face 2C1. Similarly bending the first symmetrical elastic portion 12C defines an arcuate second seal face 12C1. A distance between the first seal face 2C1 and the second seal face 12C1 is denoted by H. Examples of the present invention use 7 mm to 10.6 mm for the dimension H of the seal device 1. As far as a sheet thickness is concerned, 0.15 mm to 0.8 mm is used for the seal device 1. A imaginary line A-A connecting the center of the first seal face 2C and the center of the second seal face 12C1 should be located radially inward with respect to the center of the joint base 3. Note that the imaginary line A-A in FIG. 1 is drawn such that the first seal face 2C1 and the second seal face 12C1 are more or less aligned with the center of the joint base 3. The present embodiment can tolerate a dimensional change of the installation gap because of the ability of the first seal face 2C1 and the second seal face 12C1 for maintaining sealing contact.

FIG. 1 illustrates a typical embodiment of the present invention wherein a couple of pressure receiving slots and a joint base 3 are disposed in an inner circumferential side of the seal device 1. Having a couple of pressure receiving slots and a joint base 3 in an outer circumferential side of the seal device 1 to form an annular shape as a whole provides similar effects although a corresponding figure is not presented. The seal device 1 in FIG. 1 is assumed to be installed in an annular groove, but it may as well be manufactured in a straight form to conform to a straight groove. That is, a seal device 1 of the present invention can have a different form such as a ring form, straight form, arcuate form or the like according to the shape of mount surfaces as a whole. The seal device 1 is made of a nickel-based alloy. Example of such a material is 76% Ni-16% Cr-8% Fe, i.e., Inconel. Inconel has high ductility and outstanding corrosion resistance and can be processed by hot/cold forming. Alternative choice for the material of the seal device 1 will include Hastelloy X, Haynesalloy 25, titanium alloy or the like. Certain type of sealed fluid may suggest a surface treatment for the seal device 1. Applied material for such a surface treatment includes silver, gold, nickel, copper, fluoric resin or the like, depending on the characteristics of the sealed fluid used.

Figure 2:
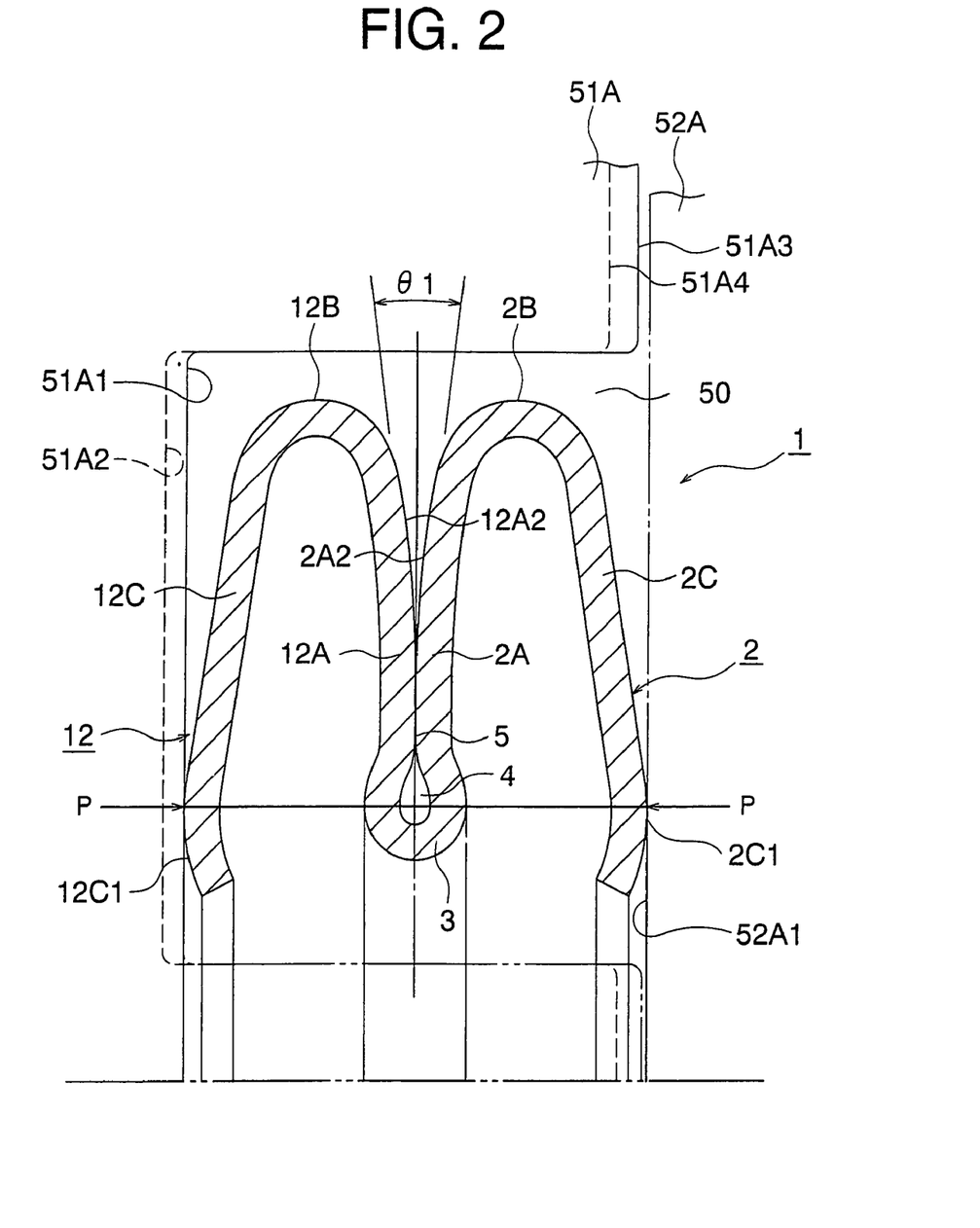
FIG. 2 is a partial cross-sectional view of a slot portion of a liquidation tank which installs the seal device of the present invention shown in FIG. 1.

FIG. 2 is a half cross sectional view of the seal device 1 of FIG. 1 which is installed in an installation annular groove 50 of a first assembly component 51A which is typically seen in a low temperature tank or the like for an aircraft engine. It is hereafter referred to FIG. 2 as well. Sealed fluid acts on the pressure receiving slots which are disposed on inner circumferential side of the seal device 1. This seal device 1 is installed under a compressed state such that a first mount surface 51A1 of a first assembly component 51A and a second mount surface 52A1 of a second assembly component 52A, respectively, are pressed against a first seal face 2C1 and a second seal face 12C1. When the first seal face 2C1 and the second seal face 12C1 of the seal device 1 are brought into a compressive contact with one another, one side surface 2A1 at the contact interface portion 5 opens up to become a first departure surface 2A2 as the result of elastic deformation of the second elastic portion 2A and the second symmetrical elastic portion 12A. Similarly, the other side surface 12A1 also opens up to become a second departure surface 12A2. The opening angle formed between the first departure surface 2A2 and the second departure surface 12A2 is defined as θ1. (see also FIG. 2) The first assembly component 51A and the second assembly component 52A contract due to a low temperature fluid and make a relative displacement to a new location which is illustrated by a broken line by which a displaced contact surface 51A4 and a displaced mount surface 51A2 are represented. The displaced contact surface 51A4 and the displaced mount surface 51A2, respectively, become a new first contact surface 51A3 and a new first mount surface 51A1 after the contraction. In this case the opening angle θ1 between the first departure surface 2A2 and the second departure surface 12A2 increases.

Although the respective amounts of displacement for the first contact surface 51A3, the first mount surface 51A, the displaced contact surface 51A4 and the displaced mount surface 51A2 are determined by external forces and thermal expansion forces given, the first seal face 2C1 and the second seal face 12C1 are allowed to make a relative movement with respect to contact surfaces (respective side surfaces 2A1, 12A1) as a fulcrum which are in contact with one another at the contact interface portion 5. The fulcrum of the contact surfaces formed by the second elastic portion 2A and the second symmetrical elastic portion 12A are capable of letting the first seal face 2C1 and the second seal face 12C1 keep up with the displacement of the first mount surface 51A1 and the second mount surface 52A1 so that seal-tight contact is maintained. Therefore, in case of displacement of the first mount surface 51A1 and the second mount surface 52A1 of assembly components 51A, 52A, the first seal face 2C1 and the second seal face 12C1 continue to exhibit outstanding seal ability by accommodating to the displacement. Reference numerals whose explanation is omitted are assumed to be the same as those of FIG. 1.

A seal device 1 previously described is installed in respective assembly components 51A, 52A and receives a pressure fluid at a couple of U-shaped pressure receiving surfaces which open toward inner circumferential side thereof. With this seal device 1, the first seal face 2C1 then comes into seal-tight contact with the second mount surface 52A1 sealing against the fluid while the second seal face 12C1 comes into seal-tight contact, with the first mount surface 51A1. On the other hand, even when the first assembly component 51A makes a movement relative to the second assembly component 52A, the first seal face 2C1 and the second seal face 12C1 are able to keep seal-tight contact against the second mount surface 52A1 and the first mount surface 51A1, respectively, in which the first seal face 2C1 and the second seal face 12C1 are supported by the contact surfaces located at the contact interface portion 5 and move in accordance with the elastic deformation of the second elastic portion 2A and the second symmetrical elastic portion 12A. Therefore, the seal device 1 is able to exhibit outstanding seal performance against fluid even under the presence of relative displacement between respective assembly components 51A, 52A.

Figure 3:
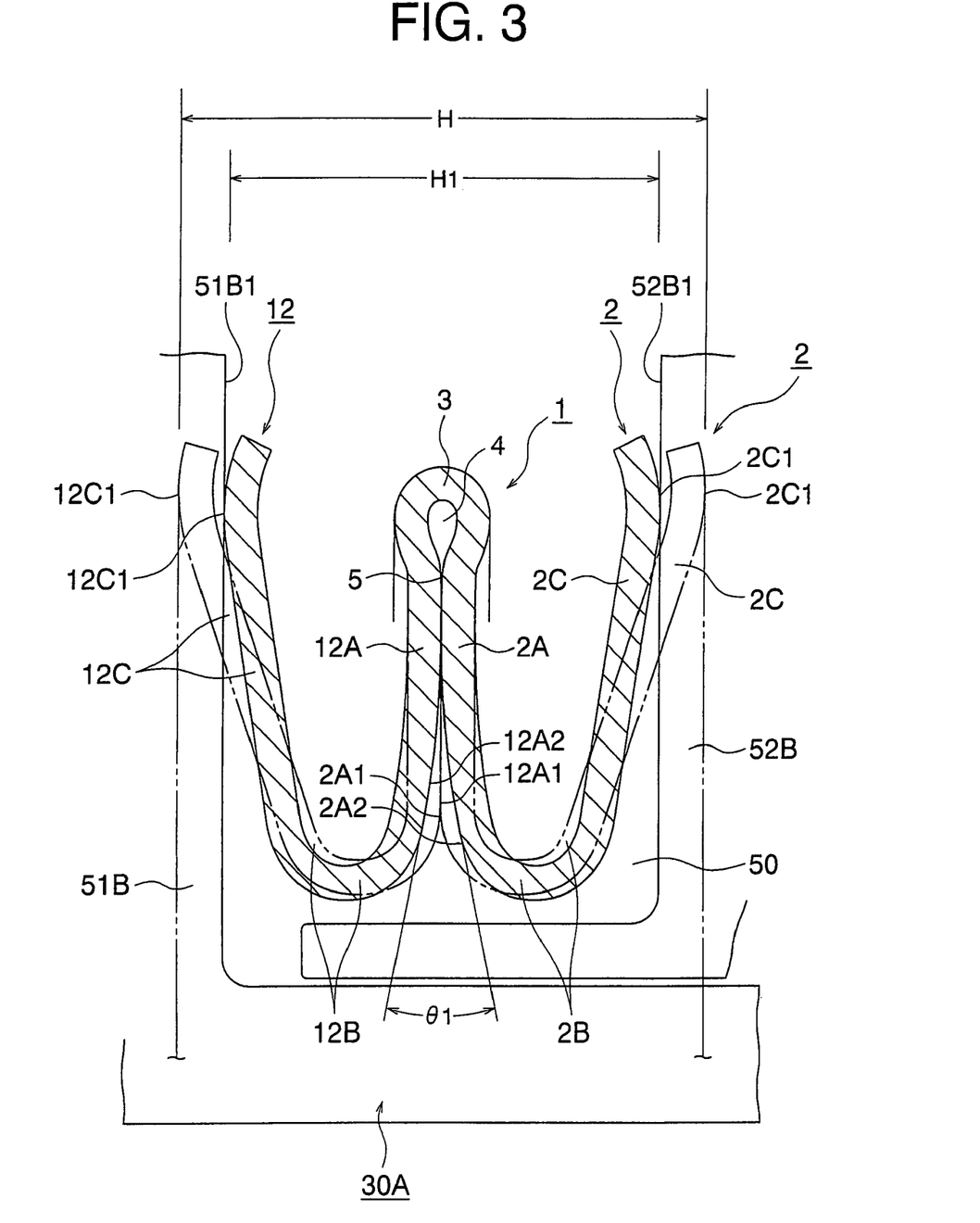
FIG. 3 is a cross-sectional view showing a typical installation of a seal device according to a second embodiment of the present invention.

FIG. 3 is a radially half cross-sectional view of a typical installation of a seal device 1 as a preferred second embodiment relative to the present invention. The seal device 1 in FIG. 3 assumes that the same reference numerals as those in FIG. 1 imply more or less identical components to be used. What makes FIG. 3 different from FIG. 1 is that the pressure receiving slots against fluid are disposed in outer circumferential side, reverse arrangement to the pressure receiving slots of the seal device 1 in FIG. 1. FIG. 3 is an installation example of the seal device 1 to a high temperature section 30A of a gas turbine in which the seal device 1 is installed within a installation space section 50 formed between a first mount surface 51B1 of a first assembly component 51B and a second mount surface 52B1 of a second assembly component 52B.

In FIG. 3, a stress-free form of the seal device 1 is represented by a virtual line. The seal device 1 is installed in an installation space portion 50 which is disposed between a first mount surface 51B1 of a first assembly component 51B and a second mount surface 52B1 of a second assembly component 52B. A deal device 1 represented by a solid line shows state thereof after installation, and elastic deformation of a first seal portion 2 and a second seal portion 12 causes a first seal face 2C1 and a second seal face 12C1 to be brought into sealing contact with a second mount surface 52B1 and a first mount surface 51B1, respectively. At the same time, a side surface 2A1 of a second elastic portion 2A shifts state thereof to a first departure surface 2A2 through elastic deformation while a side surface 12A1 of a second symmetrical elastic portion 12A shifts state thereof to a second departure surface 12A2. The first departure surface 2A2 and the second departure surface 12A2 make an opening angle θ1 at a contact interface portion 5 (see also FIG. 2), and the surfaces in contact at the contact interface portion 5 serve as a fulcrum to provide a support for sealing contact of the first seal face 2C1 and the second seal face 12C1. The fulcrum of the contact surfaces receives a resilient force from a joint base 3 of a circular cross section, and moves position thereof in accordance with elastic deformation of the second elastic portion 2A and the second symmetrical elastic portion 12A in order to maintain sealing contact of the first seal face 2C1 and the second seal face 12C1. Other parts designated by the same reference numerals to those in FIG. 2 are arranged in a similar manner.

A seal device 1 described above is installed between the first assembly component 51B and the second assembly component 52B and receives a pressure fluid at a couple of U-shaped pressure receiving surfaces which open toward inner circumferential side thereof. With this seal device 1, the first seal face 2C1 then comes into seal-tight contact with the second mount surface 52B1 sealing against the fluid while the second seal face 12C1 comes into seal-tight contact with the first mount surface 51B1. On the other hand, even when the first assembly component 51B makes a movement relative to the second assembly component 52B, the first seal face 2C1 and the second seal face 12C1 are able to keep seal-tight contact against the second mount surface 52B1 and the first mount surface 51B1, respectively, in which the first seal face 2C1 and the second seal face 12C1 are supported by the contact surfaces located at the contact interface portion 5 and move in accordance with the elastic deformation of the second elastic portion 2A and the second symmetrical elastic portion 12A. Therefore, the seal device 1 is able to exhibit outstanding seal performance against fluid even under the presence of relative displacement between the first assembly component 51B and the second assembly component 52B.

Figure 4:
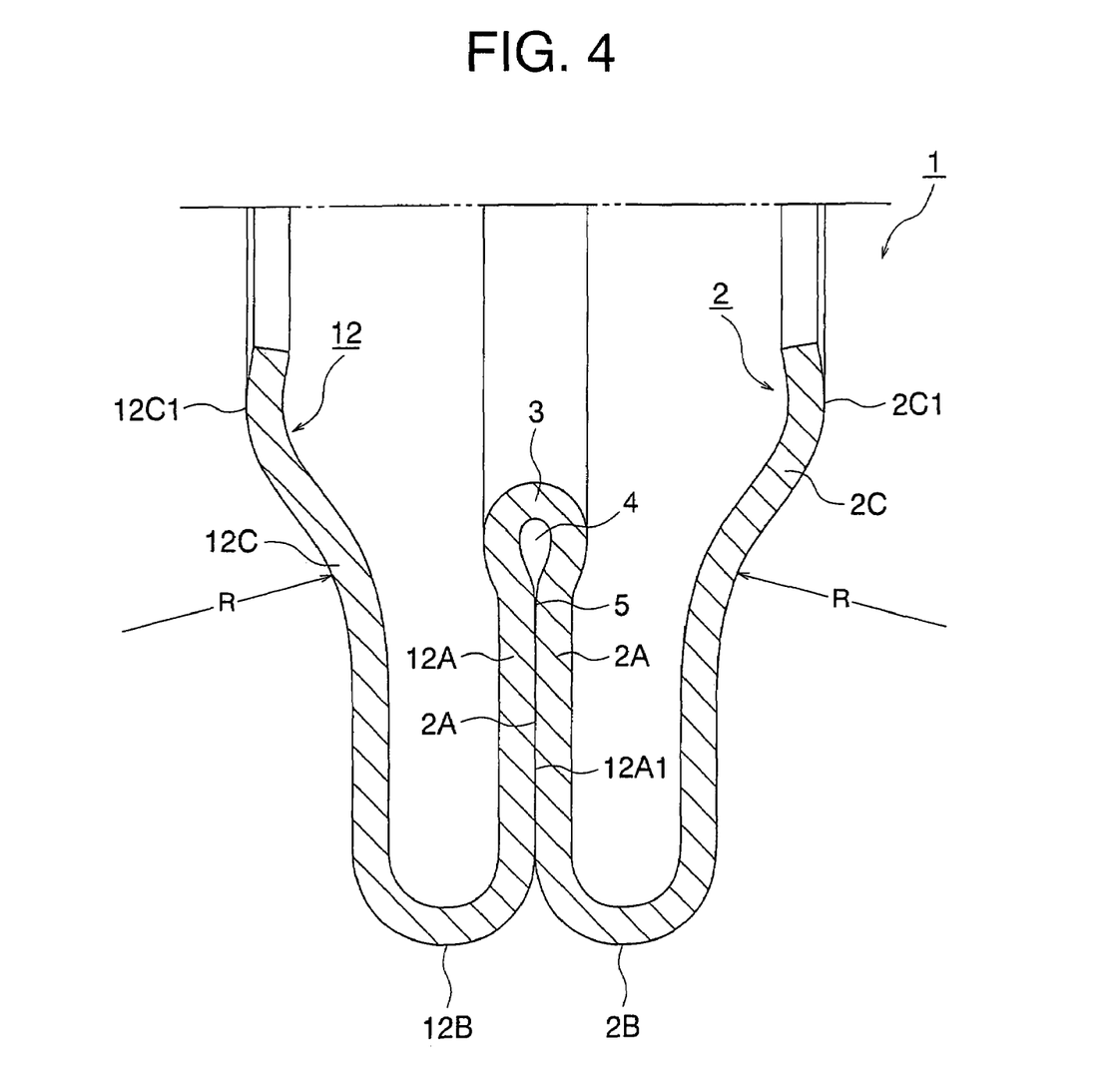
FIG. 4 is cross-sectional view of a seal device according to a third embodiment of the present invention.

FIG. 4 is a radially half cross-sectional view of a seal device 1 as a third embodiment relative to the present invention. The seal device 1 in FIG. 3 retains pressure receiving slots in inner circumferential side thereof for receiving a fluid pressure thereat. What makes FIG. 4 different from FIG. 1 is that a first elastic portion 2C and a first symmetrical elastic portion 12C have an arcuate shape of radius R which are bent in mutually departing directions, and also that a first seal face 2C1 and a second seal face 12C1 are disposed radially inward relative to a joint base 3. Other parts designated by the same reference numerals to those in FIG. 1 are assumed to be identical.

In the seal device 1 described above, the first elastic portion 2C and the first symmetrical elastic portion 12C which are bent to a resilient arcuate shape are capable of achieving a more or less uniformly distributed surface pressure thereat. Also the first seal face 2C1 and the second seal face 12C1 are disposed radially inward relative to the joint base 3 and located at more distal locations from a first bight portion 2B and a second bight portion 12B, respectively, via the first elastic portion 2C and the first symmetrical elastic portion 12C than the joint base 3. Therefore the seal device 1 is able to keep up with deformation of the mount surfaces of adjoining assembly components (not shown). This indicates that the seal device 1 not only possesses enhanced seal ability against fluid but also exhibits outstanding seal performance by keeping up with deformation of the mount surfaces.

Figure 5:
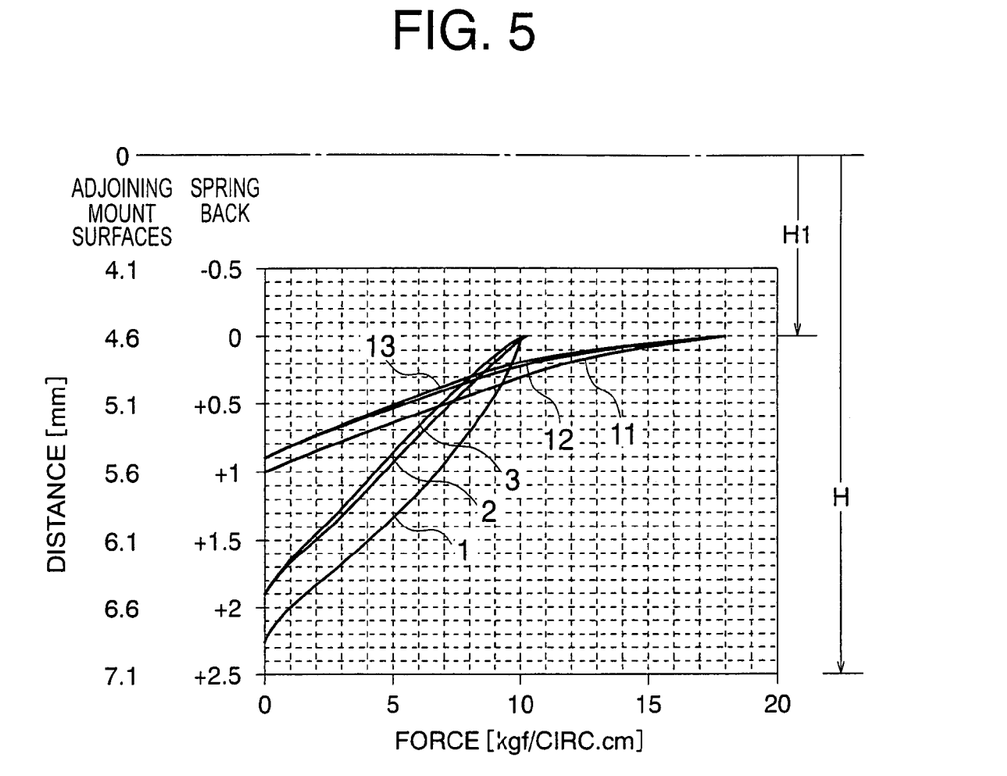
FIG. 5 is a force versus deflection graph showing comparison of characteristic curves of the seal device of the present invention and a reference example 1.

FIG. 5 shows experimental data of a seal device 1 of the present invention in FIG. 1 and a seal ring as a reference example in FIG. 8 wherein associated assembly components are subjected to a relative displacement due to high temperature. Similar results will be obtained when respective assembly components contract due to low temperature. Numerals 1, 2, 3 in FIG. 5 signify experimental data showing a force versus deflection graph for a seal device 1 of the present invention after being installed to the mount surfaces of adjoining assembly components. Also numerals 11, 12, 13 display experimental data showing a force versus deflection graph for a seal ring of the reference example after being installed to the mount surfaces of adjoining assembly components.

For the numerals 1, 2, 3 of FIG. 5, a seal device 1 of FIG. 1 is employed in which a distance H between the first seal face 2C1 and the second seal face 12C1 is set to 7.1 mm. This seal device 1 is installed as shown in FIG. 3 so that H1 is set to 4.6 mm. And experimental data are repeatedly obtained by varying a gap between the adjoining mount surfaces form 4.6 mm to 7.1 mm. The numeral 1 represents an initial measurement of a force versus deflection which is obtained by giving a displacement for the first time. Then the numerals 2 and 3 show force versus deflection graphs after repeated loading at the distance H1 by which spring back characteristics of the first seal face 2C1 and the second seal face 12C1 have already been stabilized. It has been verified that the seal device 1 of the present invention can accommodate to as much as 1.9 mm of displacement between adjoining mount surfaces. That is, the seal device 1 of the present invention not only provides a substantial spring back (about 1.9 mm) but also possesses an outstanding durability because of a strong support given at the contact surfaces of the contact interface portion 5.

For the numerals 11, 12, 13 in FIG. 5, on the other hand, the seal ring 216 as a reference example is arranged to set a distance between both seal faces thereof to 7.1 mm and to be installed within a gap 4.6 mm between the mount surfaces of adjoining assembly components as is the case for the present invention. Force versus deflection graphs are as shown in the numerals 11, 12, 13 of FIG. 5. The numeral 11 represents an initial curve of force versus deflection. The numerals 12 and 13 then show force versus deflection graphs after repeated loading at the mount surfaces by which the distance H1 between the first seal face 222A and the second seal face 222B has already been stabilized. The experimental data show that the seal ring 216 of reference example is able to accommodate to no more than about 0.9 mm of repeated displacement. That is, spring back thereof is about 0.9 mm at maximum. Also the seal ring 216 reaches plastic region thereof earlier than a seal device 1 of the present invention, thus being likely to result in less durability.

Figure 6:
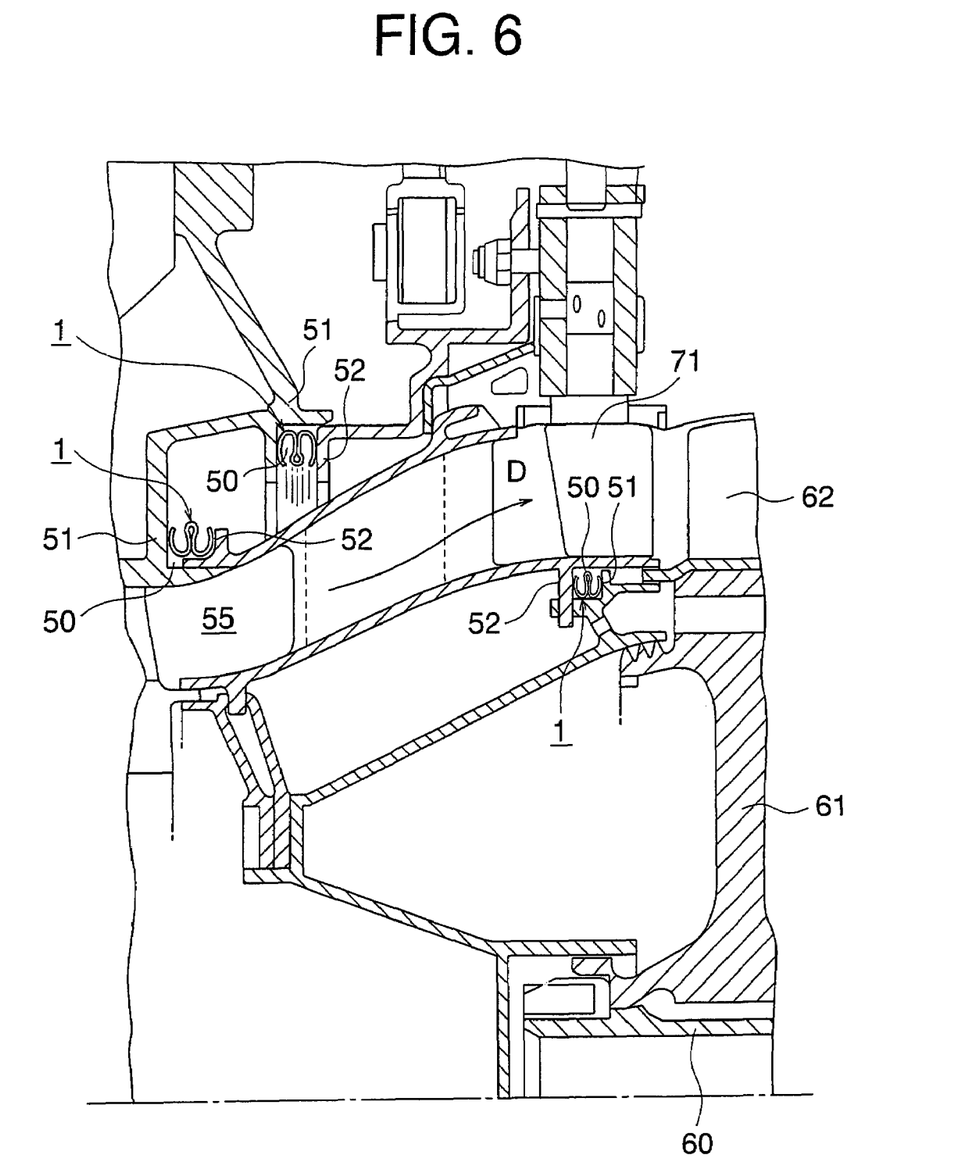
FIG. 6 is a partial cross-sectional view of a gas turbine which installs a plurality of seal devices of the present invention.

FIG. 6 shows a cross-sectional view of the vicinity of a gas turbine nozzle assembly of a gas turbine engine in which seal devices 1 of the present invention are installed between mount surfaces of assembly components 51, 52. In FIG. 6, a rotary disk 61 attached to a rotary shaft 60 disposes a blade 62 thereat. Other type of blade 71 is disposed in a fluid passage 55. High temperature combustion gases D received from a combustion chamber (not shown) is turned and accelerated through the blades 62, 71. In the construction thus described, seal devices 1 are installed in installation space portions (installation slots) 50 formed between the assembly components 51, 52 in order to effect a seal thereat. The installation space portion 50 is formed between a mount wall of the first assembly component 51 and the second assembly component 52. This first assembly component 51 and the second assembly component 52 are arranged in such a manner that the installation space portion 50 changes gap therebetween when the first assembly component 51 and the second assembly component 52 are subjected to thermal deformation due to high temperature gas D or vibratory force during rotation of the rotary shaft 60. For this fluid passage 55, seal devices 1 are used in three locations to provide a seal at installation space portions 50 of assembly components 51, 52. This seal device 1 is the one shown in FIG. 1 or FIG. 3. Therefore, as previously described for FIG. 1, the seal device 1 is capable of effecting a seal against high temperature gas D by keeping up with a wide range of relative displacement between the first assembly component 51 and the second assembly component 52.

The seal device 1 of the present invention is able to not only effect a seal but also show durability by being installed in an installation space portion 50 to which high temperature, high pressure fluid or low temperature gas operates. In addition, the seal device 1 which has a simple construction, can be installed in an installation space portion 50 of a complex form. This makes an installation of the seal device 1 straightforward and therefore reduces an installation cost. Further, even in a case wherein an installation space portion 50 of assembly components 51, 52 is subjected to a small displacement, as shown in FIG. 6, the seal device 1 is capable of providing a secure seal thereat. Also since the seal device 1 is arranged in such a way that the first seal portion 2 and the second seal portion 12 are connected via a joint base 3 by inflecting middle section thereof and a contact position of the contact interface portion 5 can be varied, the seal device 1 does not require high machining accuracy, thus reducing manufacture-cost thereof.

Next, preferred exemplary embodiments of the other inventions related to the present invention are described below.

In a seal device 1 as a second exemplary embodiment relative to the present invention; a joint base 3 is arranged to form a circular cross section and to retain an annular space portion 4 therewithin.

According to the seal device 1 of the second exemplary embodiment, since the joint base 3 is bento to a circular shape and leaves the annular space portion 4 therewithin, a side surface 2A1 of a second elastic portion 2A and a side surface 12A1 of a second symmetrical elastic portion 12A can be arranged so as to form a contact relation or proximity contact relation with one another. Furthermore, when the side surface 2A1 of the second elastic portion 2A and the side surface 12A1 of the second symmetrical elastic portion 12A are subjected to elastic deformation while making an opening angle θ1 therebetween, the elastic deformation of the second elastic portion 2A and the second symmetrical elastic portion 12A takes place with respect to the fulcrum point of the contact surface at the contact interface portion 5 which moves position thereof while the opening angle θ1 changes. Therefore the first seal face 2C1 and the second seal face 12C1 are capable of exhibiting outstanding seal ability against respective mount surfaces. Even when the second elastic portion 2A and the second symmetrical elastic portion 12A are designed to be rather short in length thereof, the joint base 3 with the annular space portion 4 therewithin enables the side surface 2A1 of the second elastic portion 2A and the side surface 12A1 of the second symmetrical elastic portion 12A to elastically deform in accordance with the varying opening angle θ1. The fact that the second elastic portion 2A and the second symmetrical elastic portion 12A can be made short in turn makes it possible for the seal device 1 to be installed in a small side of mount surfaces.

In a seal device 1 as a third exemplary embodiment relative to the present invention, a first seal face 2C1 and a second seal face 12C1 are located at more distal positions from a first bight portion 2B and a second bight portion 12B, respectively, than a joint base 3.

According to the seal device 1 as the third exemplary embodiment relative to the present invention, since the first seal face 2C1 and the second seal face 12C1, respectively, are located at more distal positions from the first bight portion 2B and the second bight portion 12B than the joint base 3, a range of elastic deformation of a first elastic portion 2C and a first symmetrical elastic portion 12C relative to the first seal face 2C1 and the second seal face 12C1, respectively, can be increased. The expanded range of elastic deformation for the first elastic portion 2C and the first symmetrical elastic portion 12C in turn increases a seal contact range of the first seal face 2C1 and the second seal face 12C1 with fulcrum thereof located at the contact surfaces of the contact interface portion 5. Therefore the respective elastic portions of the seal device 1, i.e., the first elastic portion 2C, the second elastic portion 2A, the first symmetrical elastic portion 12C and the second symmetrical elastic portion 12A, can be made compact and seal ability thereof against deformation of mount surfaces can be improved as well.

In a seal device 1 as a fourth exemplary embodiment relative to the present invention, a side surface 2A1 of a second elastic portion 2A and a side surface 12A1 of a second symmetrical elastic portion 12A are arranged to form planar surfaces.

According to the seal device 1 as the fourth exemplary embodiment relative to the present invention, since the side surface 2A1 of the second elastic portion 2A and the side surface 12A1 of the second symmetrical elastic portion 12A are arranged to form planer surfaces, when the first seal face 2C1 and the second seal face 12C1 receive an urging pressure, a change in the opening angle θ1 caused by the elastic deformation of the side surfaces 2A1, 12A1 of the second elastic portion 2A and the second symmetrical elastic portion 12A, respectively, ensures to keep seal-tight contact of the first seal face 2C1 and the second seal face 12C1 against mount surfaces. Thus the first seal face 2C1 and the second seal face 12C1 are able to improve seal ability thereof against the mount surfaces.

In a seal device 1 as a fifth exemplary embodiment relative to the present invention, a first seal portion 2 and a second seal portion 12 are integrally constructed by inflecting a nickel-based alloy sheet or heat resistive alloy sheet.

According to the seal device 1 as the fifth exemplary embodiment relative to the present invention, since the first seal portion 2 and the second seal portion 12 are made of a nickel-based alloy sheet or heat resistive alloy sheet, use of press forming enables to manufacture an integral construction and high corrosion resistance as well as high heat resistance can be expected. This nickel-based alloy includes precipitation hardened Ni alloy, which is well-known for outstanding high temperature strength and corrosion resistance. The material also retains a superb creep strength at high temperature (about 700° C.), good weldability and a crack-free characteristic.

As described above, the seal device of the present invention effects a seal against a high temperature, high pressure fluid or low temperature gas and can effectively be used for an apparatus in which a distance between mount surfaces of assembly components changes. In particular, a seal device of this kind is effective for the use of the mounting slots of turbine engine, nuclear apparatus, aircraft tank or the like in which high temperature and high pressure fluid or low temperature gas is to be sealed against thereby at the mounting slots. The seal device also can effectively be used for a mounting slot in a small size. Further, the seal device enjoys a low manufacture cost.

Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A seal device for effecting a seal at a gap between mount surfaces of assembly components, said gap between said mount surfaces being varied, said seal device comprising:
   a) a first seal portion formed from elastic sheet material, having a U-shaped cross-section, and having a first elastic portion corresponding to one side of said U-shaped cross-section, a second elastic portion corresponding to another side of said U-shaped cross-section, and a first bight portion connecting one end portion of said first elastic portion and one end portion of said second elastic portion;
   b) a second seal portion formed from elastic sheet material, having a U-shaped cross-section, and having a first elastic portion corresponding to one side of said U-shaped cross-section and being symmetric to said first elastic portion of said first seal portion, a second elastic portion corresponding to another side of said U-shaped cross-section and being symmetric to said second elastic portion of said first seal portion, and a second bight portion connecting ends of said first and second elastic portions of said second seal portion,
   said second elastic portion of said second seal portion arranged to face said second elastic portion of said first seal portion,
   wherein during a compression free state, an outer side surface of said second elastic portion of said second seal portion faces and contacts an outer side surface of said second elastic portion of said first seal portion, and during a compression state, a part of the outer side surface of said second elastic portion of said second seal portion separates from and is free of contacting the outer side surface of said second elastic portion of said first seal portion;
   c) a first seal face bent to an arcuate shape being continuous with another end portion of said first elastic portion of said first seal portion, and contacting the mount surface of one assembly component;
   d) a second seal face bent to an arcuate shape being continuous with another end portion of said first elastic portion of said second seal portion, and contacting the mount surface of another assembly component;
   e) a joint base continuously connecting another end portion of said second elastic portion of said first seal portion and another end portion of said second elastic portion of said second seal portion and which is arranged to form a circular cross-section and to retain an annular space portion therewithin;
   f) a pressure receiving slot of said first seal portion formed in an inner circumferential side of said first seal portion, and inner circumferential surface of said pressure receiving slot of said first seal portion being formed as a pressure receiving surface on which sealed fluid acts through an open portion between said first seal face and said joint base; and g) a pressure receiving slot of said second seal portion formed in an inner circumferential side of said second seal portion, an inner circumferential surface of said pressure receiving slot of said second seal portion being formed as a pressure receiving surface on which the sealed fluid acts through an open portion between said second seal face and said joint base.

2. A seal device as claimed in claim 1, wherein said second elastic portion of said second seal portion and said second elastic portion of said first seal portion are arranged in manner to face one another have a contact interface portion at a joint base side and a departure portion at a first bight portion and a second bight portion side, an outer side surface of said second elastic portion of said first seal portion and an outer side surface of said second elastic portion of said second seal portion being in contact with one another in said contact interface portion and opening one another to become a first departure surface and a second departure surface in said departure portion, wherein said contact interface portion and said departure portion vary in accordance with a movement of said first seal face and/or said second seal face, and wherein said first seal face and/or said second seal face are allowed to make a relative movement on a fulcrum of contact interface portion.

3. A seal device as claimed in claim 1, wherein said first seal face and said second seal face are located at more distal positions from said first bight portion and said second bight portion, respectively, than said joint base.

4. A seal device as claimed in claim 1, wherein said first seal portion and said second seal portion are integrally constructed by inflecting a nickel-based alloy sheet or heat resistive alloy sheet.

* * * * *